United States Patent [19]

Lauer

[11] Patent Number: 4,747,425
[45] Date of Patent: May 31, 1988

[54] 3-WAY PRESSURE REDUCING VALVE HAVING MEANS FOR MONITORING THE SECONDARY PRESSURE

[75] Inventor: Peter Lauer, Lohr-Steinbach, Fed. Rep. of Germany

[73] Assignee: Mannesmann Rexroth GmbH, Lohr, Fed. Rep. of Germany

[21] Appl. No.: 906,451

[22] Filed: Sep. 12, 1986

[30] Foreign Application Priority Data

Sep. 12, 1985 [DE] Fed. Rep. of Germany ....... 3532592

[51] Int. Cl.$^4$ ............................................. G05D 16/10
[52] U.S. Cl. .................................. 137/116.3; 137/557
[58] Field of Search ............. 137/116.3, 116.5, 505.11, 137/554, 557, 102, 227

[56] References Cited

U.S. PATENT DOCUMENTS

| | | | |
|---|---|---|---|
| 2,520,353 | 8/1950 | Fernandez-Yanez et al. | 137/227 X |
| 2,965,120 | 12/1960 | Snyder | 137/116.3 |
| 3,227,172 | 1/1966 | Sims et al. | 137/116.3 |
| 3,272,220 | 9/1966 | Frania et al. | 137/116.5 |
| 3,520,322 | 7/1970 | Kaptur | 137/116.3 |
| 3,625,479 | 12/1971 | Hammon | 137/116.3 X |
| 3,738,308 | 6/1973 | Barabino | 137/227 X |
| 3,741,244 | 6/1973 | Ise | 137/554 |
| 4,263,938 | 4/1981 | Peters | 137/557 |

Primary Examiner—Martin P. Schwadron
Assistant Examiner—Stephen M. Hepperle
Attorney, Agent, or Firm—Cushman, Darby & Cushman

[57] ABSTRACT

The invention relates to a three-way pressure reducing valve for reducing a primary pressure to a secondary pressure. Said three-way pressure reducing valve comprises means for monitoring the secondary pressure. First spool means of said pressure reducing valve and second spool means of said monitoring means are provided with first and second spring means, respectively. Further, first and second adjustment means, respectively, are provided said first and said second spool means being coaxially arranged.

10 Claims, 4 Drawing Sheets

3-WAY PRESSURE REDUCING VALVE HAVING MEANS FOR MONITORING THE SECONDARY PRESSURE

The invention relates to a three-way pressure reducing valve with means for monitoring the secondary pressure. The invention relates in particular to a direct controled three-way pressure reducing valve.

Pressure reducing valves, also known as pressure regulating valves, are used for limiting the secondary pressure, i. e. the output pressure of the pressure reducing valve. In a pressure reducing valve the secondary pressure is held constant independent of the input or primary pressure as soon as this reaches the set value. It is, therefore, possible to reduce the pressure in one part of a hydraulic system by means of a pressure reducing valve to a value which is lower than the system pressure.

Frequently pressure reducing valves are used in hydraulic systems not only for providing a constant secondary pressure, but also for monitoring the actual secondary or operating pressure. This monitoring operation is carried out with regard to a predetermined required value of the secondary pressure. This pressure may be called the monitoring pressure value. To cary out said monitoring operation signal generating means are provided for supplying a signal as soon as the monitoring pressure is reached. This will be the case, for all practical purposes, when the hydraulic system is switched on. Moreover, said signal generating means are designed to supply another signal if during the operation of the hydraulic system the pressure falls below the monitoring pressure.

The secondary pressure for instance for hydraulic spindless of automatic turning lathes or for hydraulic clamping cylinders must not fall below a set predetermined secondary pressure value (monitoring pressure value), so as to provide for a safe clamping action of a work piece during the entire duration of the machining process. So far, pressure switching means were required in addition to said pressure reducing valve. Said pressure switching means are adjusted to the lowest admissible secondary pressure value (monitoring pressure value). As soon as the existing pressure should fall below the monitoring pressure value, for instance due to a disturbance, said pressure switching means cause the shut-off of the machine tool or lathe on which the work piece (or tool) is held by means of force operated clamping means. This switch-off may be provided by actuating an electric apparatus which will cause the switch-off.

According to said known safety means for the clamping means of a work piece frequently the need existed to provide for a new adjustment of the lower admissible secondary pressure value for the work piece clamping menas. This need, for instance occurred when the machine tool, for instance a lathe machine had to be prepared for different work pieces requiring a different admissible secondary pressure value. For this purpose frequently a plurality of pressure switching means had to be adjusted by hand to said new pressure values. In fact, in addition to the new adjustment of the secondary pressure at the actual pressure reducing valve a large amount of time was required for this purpose. Moreover, the adjustment of the new pressure values depdnds on the care taken by the operator. In case the pressure switching means are set at pressure values which are too low, serious injuries can be the consequence. For that reason, the pressure switching means should be lockable for reasons of safety.

It is an object of the present invention to provide a three-way pressure reducing valve having monitoring means for the secondary pressure such that for each adjustment of the secondary pressure value automatically the adjustment of the monitoring pressure value is assured. It is another object of the invention to provide a three-way pressure reducing valve having secondary pressure monitoring means without the requirement of having to readjust additional pressure switching means.

It is another object of the invention to provide a pressure reducing valve which, when adjusted to a desired secondary pressure value provides automatically for the adjustment of an appropriate desired monitoring pressure value for the secondary pressure monitoring means. According to another object of the invention the pressure reducing valve having secondary pressure monitoring means provides for a change of the differential value between the desired secondary pressure value and the monitoring pressure value automatically.

In accordance with a further object of the invention a direct controled three-way pressure reducing valve having secondary pressure monitoring means is provided which is of simple design and can be manufactured at low cost. It is a further object of the invention to provide a pressure reducing valve having secondary pressure monitoring means such that a small size is achieved.

Generally, the invention provides for a direct controled three-way pressure reducing valve having secondary pressure monitoring means, wherein adjustment means are provided which allow the common adjustment of a secondary pressure adjustment menas and a monitoring pressure adjustment means. This common adjustment is provided specifically such that for an adjustment of the secondary pressure value simultaneously the appropriate monitoring pressure value is automatically adjusted.

In accordance with one embodiment of the invention the pressure reducing valve comprises a secondary pressure adjustment means which acts upon spring means which in turn cooperate with spool means of the pressure reducing valve. Further, the monitoring pressure adjustment means act upon a spring means of metering spool means. the control spool means and the metering spool means comprise different areas which are subjected to the secondary pressure and the spring constant of the spring means of the control spool means and the spring constant of the spring means of the metering spool means have the same ratio ad the areas of the control spool means and themetering spool means subjected to said pressure.

BRIEF DESCRIPTION OF THE DRAWINGS

The above and other objects and advantages of the present invention will become apparent to those skilled in the art from the following description when read in conjunction with the accompanying drawings wherein.

Figure 1:
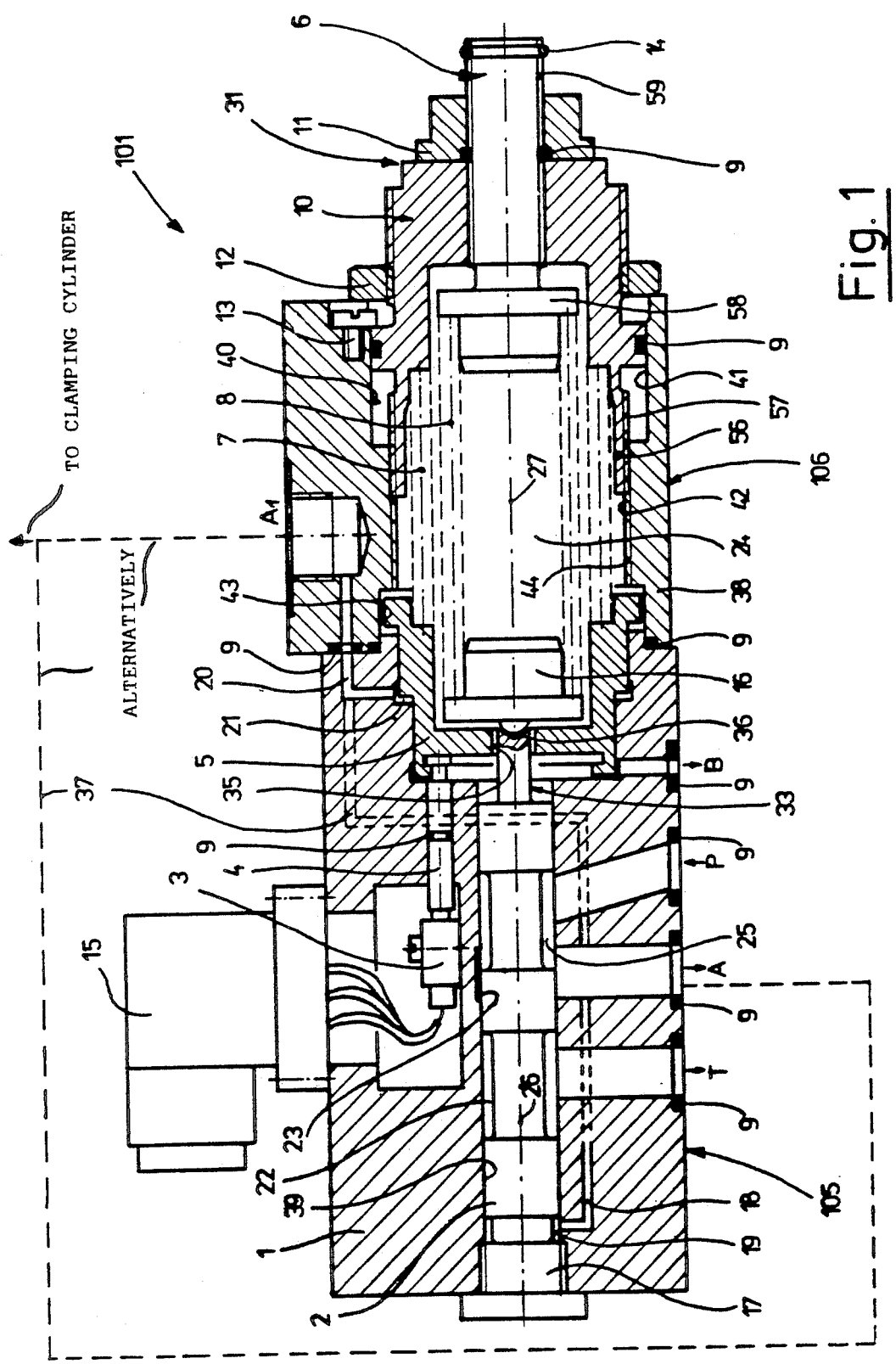
FIG. 1 is a longitudinal sectional view of a first embodiment of a direct controlled three-way pressure reducing valve having secondary pressure monitoring means.
Figure 2:
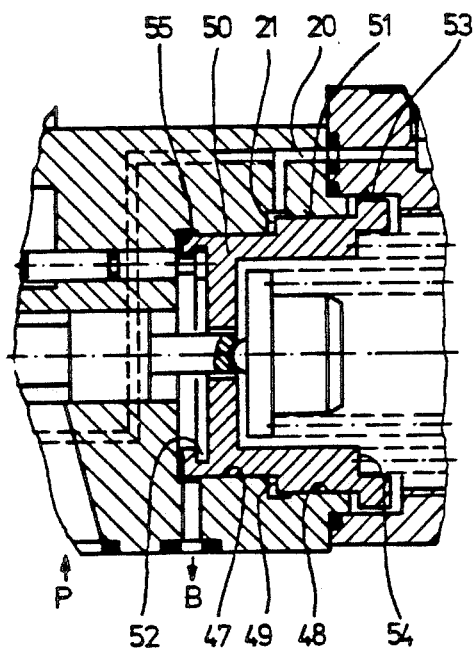
FIG. 2 is a partial view of FIG. 1 showing additional reference numerals more clearly.
Figure 3:
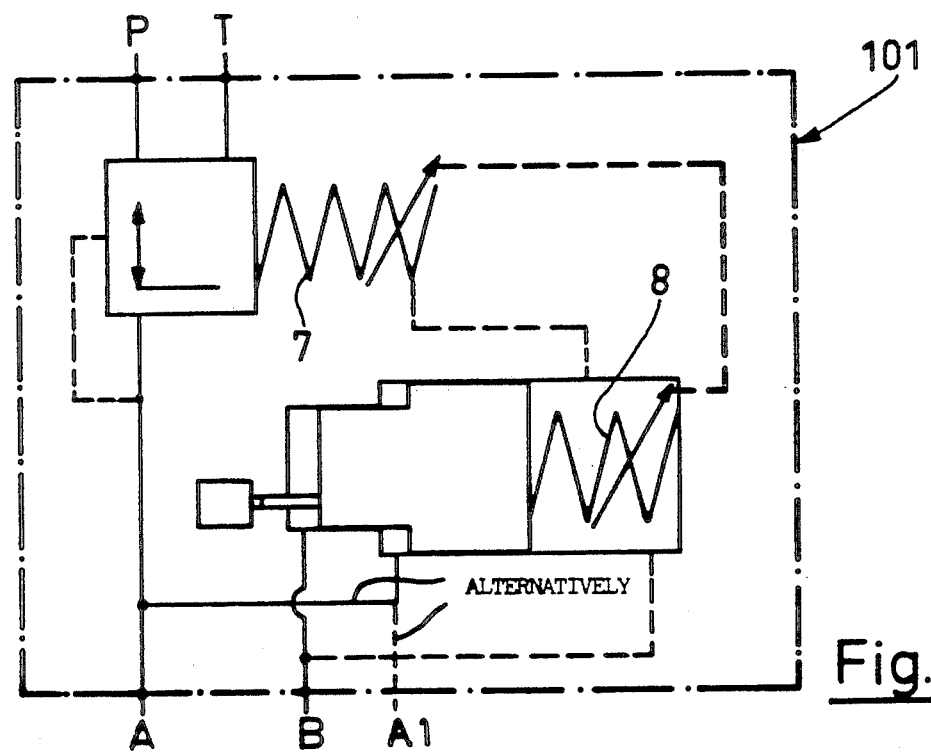
FIG. 3 is a schematical representation of the embodiment of FIG. 1.

Referring now to the drawings, with particular reference to FIGS. 1 to 3, there is illustrated a direct controlled pressure reducing valve apparatus 101 having a built-in integrated pressure monitoring means 106. In the embodiment of FIG. 1 the pressure reducing valve as such is referred to by reference numeral 105 and the pressure monitoring means (i.e. the secondary pressure monitoring means) is referred to by reference numeral 106.

The pressure reducing valve 105 comprises a housing 1 having a longitudinal bore 39. A control spool 2 is reciprocally mounted in said longitudinal bore 39. At its one end said longitudinal bore 39 is closed by means of a closing screw 17. The control spool 2 defines a pressure chamber 19 adjacent to the closing screw 17, an annular channel 22 in the area of a tank port T, and an annular channel 25 in the area of a user or load port A and a pump port P. Moreover, the control spool 2 comprises coupling means in the form of a spool rod extension 33. The control spool 2 is urged into its initial or starting position shown in FIG. 1 by means of a pressure spring 8 yet to be described. In the initial position of the control spool the pressure reducing valve 105 is opened, i.e. the pump port P is connected with the load port A so that pressure medium, preferably oil, may flow from the pump connected to the pump port P to the load connected with the load port A.

Within a recess of the housing a micro-switch 3 is located and is connected via a load means to a cable termination means 15 for supplying information concerning the position of the micro-switch 3 to control means as is known in the art. The micro-switch 3 can be actuated by means of a switching pin 4. The switching pin 4 is reciprocally mounted in a bore which extends in a parallel offset relation to said longitudinal bore 39. A seal 9 surrounds pin 4.

The longitudinal bore 39 of the valve 105 comprises a longitudinal or central axis 26.

Still referring to FIG. 1 it will be noted that a passage means 18 is provided in said housing 1. Said passage means provides a connection between load port A and said pressure chamber 19. It should be noted that the end of the control spool 2 facing towards the closing screw 17 defines a pressure area or pressure surface having the size F1.

The pressure monitoring means 106 comprise a housing 38 which is provided with a longitudinal bore 40. Longitudinal bore 40 has a longitudinal or central axis 27 which is in alignment with longitudinal axis 26 of the pressure reducing valve 105.

Micro-switch 3 is adapted to supply a first signal as soon as the monitoring pressure is reached, a situation which will occur for all practical purpose when the hydraulic system is switched on, a hydraulic system to which the three-way pressure reducing valve belongs. The micro-switch 3 supplies a second signal in a situation where during the operation of the hydraulic system the pressure falls below the monitoring pressure.

The longitudinal bore 40 of the housing 30 comprises bore sections 41, 42, 43. The bore section 42 has a smaller diameter than the bore sections 41 and 43. Moreover, bore section 42 is provided with thread means 44.

Referring to FIGS. 1 and 2 it will be noted that a metering spool (metering spool means) 5 is reciprocally mounted partially within housing 1 and partially within housing 38. The metering spool 5 has the form of a step-shaped spool. The metering spool 5 comprises three circumferential sections 50, 51, and 53 having an increasing diameter in said sequence. Spool 5 is mounted with said circumferential section 50 in a bore section 47 of bore 39. The bore section 47 has a larger diameter than the remainder of the longitudinal bore 39. Again in housing 1 a bore section 48 is provided adjacent to said bore section 47, said bore section 48 again having a larger diameter than the bore section 47. Within bore section 48 spool 5 is mounted with its circumferential section 51. Finally, spool 5 comprises another circumferential section 53 featuring the largest diameter, said section 53 being mounted in the area of the bore section 43 of the longitudinal bore 40. Housing 38 is fixedly mounted to housing 1 in a manner not shown and with a seal 9 arranged between said housing 38 and housing 1. Additional seals 9 are shown at various locations so as to provide for the required sealing effect for the pressurized fluid used in the hydraulic system.

It will be appreciated that between bore section 47 and bore section 48 a pressure chamber 21 is formed. Said pressure chamber 21 is connected via passage means 20 with a port A1. Port A1 is connected via a connecting line 37 with the load port A. The pressure within pressure chamber 21 acts on the pressure surface or area 49 of spool 5. The size of the pressure area 49 is referred to by F2. It should be noted that the connecting line 37 can be located, if desired, within housing 1 as is also shown by dotted lines in FIG. 1. In the latter case the port A1 would have to be closed. The two shown lines 37 are used alternatively.

FIG. 1 as well as FIG. 2 show the valve 101 in its initial or rest position. In said initial position a pressure spring 7 acts on an abutment surface 54 (FIG. 2) such that spool 5 is in abutment at an abutment surface 55 of housing 1. The other end of pressure spring 7 is in abutment with adjusting means which are provided in the form of an adjusting screw 10. A pressure spring 8 is located concentrically and coaxially within said pressure spring 7 and is adapted to hold the control spool 2 in its initial position. The force of spring 8 being transmitted to said spool 2 via a spring plate 16. Spring plate 16 transmits the force of spring 8 via a friction-less bearing means 36 to said coupling means 33 and consequently to the control spool 2. The coupling means in the form of the spool rod extension 33 extends through a bore 35 in a bottom wall of the spool 5. Said bore 35 is located on longitudinal axes 26 and 27, respectively. Within said bottom wall of spool 5, facing towards the control spool 2, a recess defining an annular groove 52 is formed. Said annular groove 52 is adapted to provide coupling means for said switching pin 4, i.e. the head of said switching pin 4 is in engagement with said annular groove 52.

The adjustment means 10 provided in the form of an adjustment screw is sealed by means of seals 9 within bore section 41 and it carries at a sleeve-shaped end 56 outer thread means 57. Said outer thread means 57 is in engagement with inner thread means 44 provided by bore section 42. The respective position of the adjustment screw 10 can be fixedly located by means of a nut 12.

Within the spring chamber 24 which is bordered by the adjustment screw 10 the adjustment means 6 for the pressure spring 8 is arranged and again located on the longitudinal axis 27. Pressure spring 8 abuts against a spring plate 58 of the adjustment means 6. The adjustment means 6 is provided in the form of a bolt or screw. The adjustment means in the form of bolt 6 comprises outer thread means 59 onto which a nut 11 can be screwed, so as to fixedly mount said adjusting means 6 with respect to said adjusting means 10. A screw or bolt 13 limits the movement of the adjustment screw 10 in outward direction. Thus, adjustment means 10 and adjustment means 6 form a common or combined adjustment means for both springs 7 and 8 simultaneously.

In view of the above features of the invention, a basic concept of the invention resides in the fact that the spools 2 and 5 are concentrically arranged and are each biased by a pressure spring 8 and 7, respectively. The spring constants of said pressure springs 8 and 7 have the same ratio as their appropriate areas which are subject to pressure of the pressure medium, i.e. the following equation holds true:

$$\frac{R_1}{R_2} = \frac{F_2}{F_1}$$

wherein R1 is the spring constant of spring 7, R2 is the spring constant of spring 8, F1 is the pressure area of the control spool 2 and F2 is the pressure area 49 of the spool 5. The design of the invention allows the concentric design of the adjusting means 31 and its two adjustment means 6 and 10, i.e. the adjustment means for the two pressure springs 8 and 7.

An important advantage of the embodiment of FIG. 1 is the fact that control spool 2 and metering spool 5 cannot influence each other due to friction. Further, the possibility exists that when rotating, i.e. when adjusting the adjustment screw 10 for a new adjustment of a secondary or working pressure at the same time the required monitoring pressure is changed also. The pressure differential between the secondary pressure (working or operating pressure) and the monitoring pressure can be adjusted at will by means of the adjustment means 6. The concentric design of spools and springs allows for an extremely compact arrangement.

Even though the operation of the valve apparatus 101 of FIG. 1 should be clear to a man skilled in the art based on the above description the following additional comments regarding the function of the direct controlled pressure reducing valve having a built-in integrated pressure monitoring means will be provided.

A pressure medium, preferrably oil, is supplied by a pump not shown to the pump port P and thus provides a pressure built-up in annular channel 25 and also, via channel means 18, in chamber 19. Further the so-called monitoring pressure is applied to port A1 by means of line 37. Said monitoring pressure is connected via channel means 20 to chamber 21 and acts on the annular or pressure area 49 of the step-shaped spool 5. Alternatively, if desired, the oil coming from port A can also be supplied to chamber 21 and act on pressure area 49 via said channel means 37. Said channel means 37 are, as already mentioned, located in housing 1 and are shown in FIG. 1 in dotted lines.

Initially, by means of adjustment means 6 the desired reduced secondary pressure in the load port A is adjusted, and by means of adjustment means 10 the lowermost admissible pressure value, i.e. the monitoring pressure value in port A1 is adjusted. The lower monitoring pressure is the pressure for which an electrical signal is supposed to be generated by a micro-switch 3, in case said pressure is reached.

When during the beginning of the operation initially the secondary pressure increases above the monitoring pressure value of metering spool 5 (the monitoring pressure is adjusted to a lower value than the secondary pressure) then the metering spool 5 will move towards the right in FIG. 1 and trigger by means of switching pin 4 an electrical signal through said micro-switch 3. This signal for instance signalizes that the machine tool is ready for operation.

If thereafter the pressure (i.e. the secondary pressure) increases further, the control spool 2 will move towards the right into its control position, so as to maintain the secondary pressure in the load port A constant as is the proper function of a pressure reducing valve. Consequently, if the secondary pressure increases above the adjusted value of the secondary pressure, i.e. the admissible pressure in port A increases further, then the ring channel 22 will reach a control edge or control land 23 and the pressure safety means at the input side, i.e. the load port A comes into action by providing a connection between port A and the tank port T. In this context it should be noted that the pressure release of the spring chamber 24 which is essentially located within housing 38 is always provided towards the pressure-less port B, i.e. a port which is on atmospheric pressure.

In case that the pressure in port A and port A1, respectively, decreases to the lower admissible monitoring pressure then the control spool 2 moves from a higher pressure value first leftwardly against the abutment at the closing screw 17, and for a lower value the metering spool 5 moves leftwardly towards the housing abutment at the abutment surface 55 and causes via switching pin 4 the micro-switch 3 to provide again an electrical signal. This electrical signal will, for instance, cause the shut-down of the machine tool inasmuch as the available secondary pressure is not sufficient for clamping the work piece to be machined with the required minimum clamping pressure.

If it is necessary to adjust the secondary pressure in load port A to a different new pressure value, then the nut 12 will be loosened and the adjustment screw or bolt 10 will be adjusted. By rotating the adjustment screw 10, the two pressure values, i.e. the secondary pressure value and the monitoring pressure value will be changed, always maintaining the same pressure differential between said two values. According to the invention, it is also possible to change the pressure differential between the desired secondary pressure value and the monitoring pressure value. This is done by loosening the nut 11 and adjusting the adjustment means 6. A ring 14 serves as an adjustment limit for the adjustment means 6.

Figure 4:
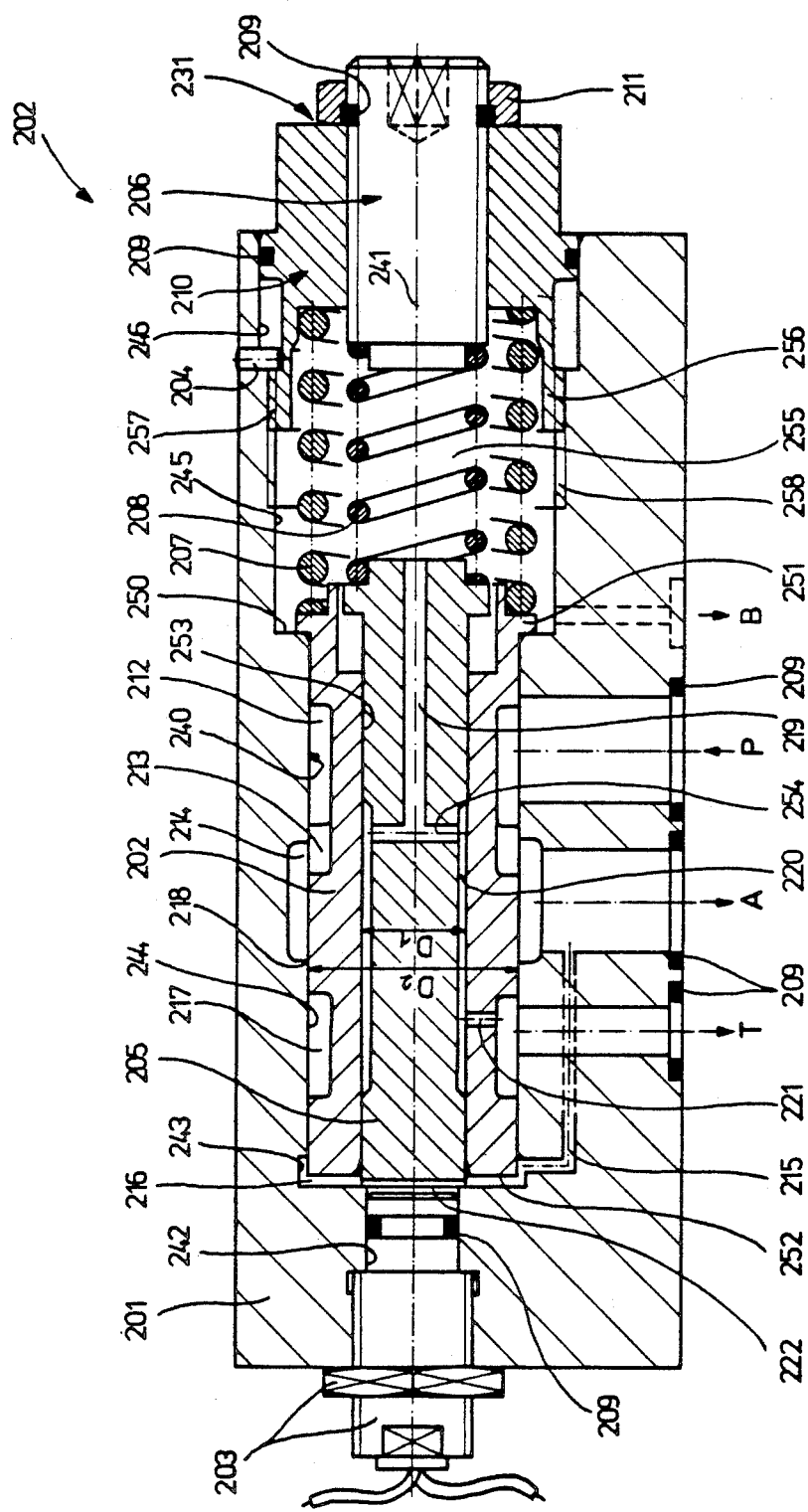
FIG. 4 is a longitudinal sectional view of a second embodiment of a direct controlled three-way pressure reducing valve having secondary pressure monitoring means.
Figure 5:
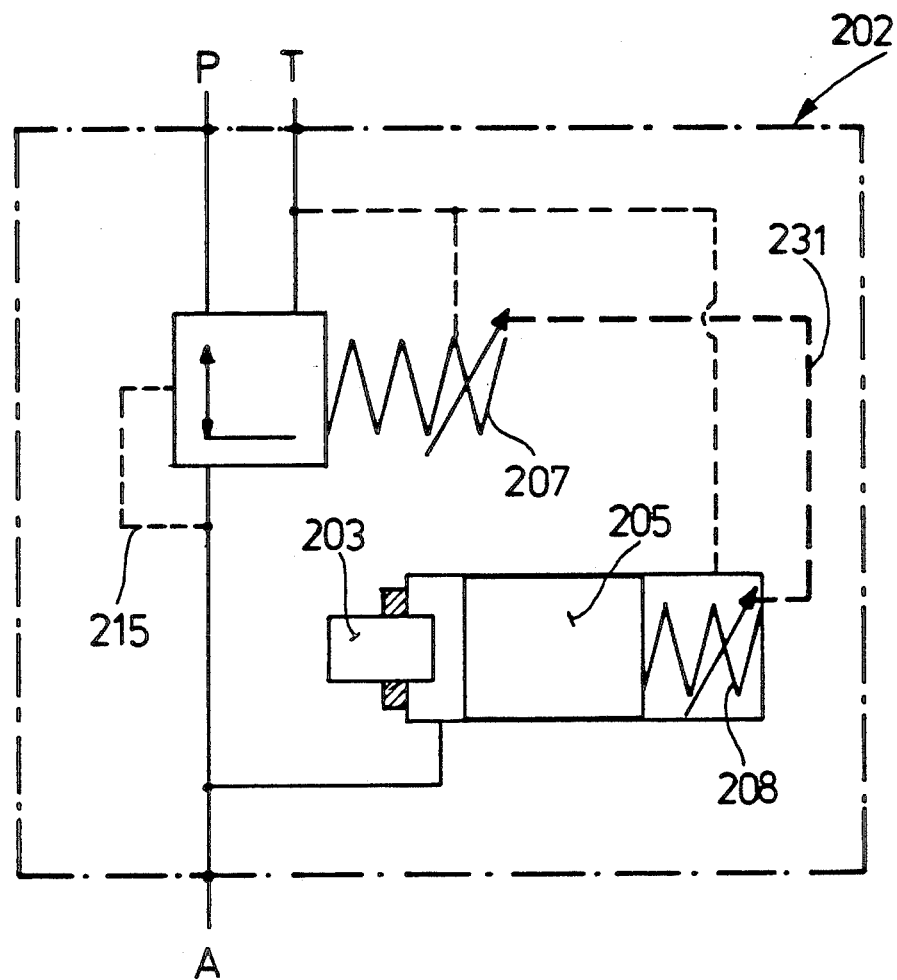
FIG. 5 is a schematic representation of the embodiment of FIG. 4.

FIGS. 4 and 5 disclose a second embodiment of the invention, i.e., a pressure reducing valve apparatus 202 comprising a directly controlled pressure reducing valve and a built-in integrated pressure monitoring means.

Apparatus 202 comprises a housing 201 having a longitudinal bore 240. Within said bore 240, a control spool 202 is reciprocally mounted on a longitudinal or center axis 241. The longitudinal bore 240 comprises a plurality of bore sections 242, 243, 244, 245 and 246 having different diameters. Within bore section 242, an inductive switch 203 is arranged and sealed by a seal 209. Within housing 201, the following ports are provided: a tank port T, a user or load port A and a pump port P. If desired, a relief of a spring chamber 254 yet to be described by an additional port B is possible, as is shown with dotted lines.

Within said control spool 202, annular channels 212 and 217 and control grooves 213 are provided. In the area of the load port A, an annular channel 214 is formed in the housing 201 and defines a control edge 218 facing towards the tank port T.

Control spool 202 is held in its initial or start position shown in FIG. 4 by means of a spring 207. Spring 207 acts on an edge portion 251 of spool 202 and urges said spool against an abutment surface 250 of housing 201. At the opposite end of the control spool 202, a pressure chamber 216 is formed. Pressure chamber 216 is connected via a channel 215 with the load port A. Consequently, the pressure existing in the load port A also exists in pressure chamber 216. This pressure acts on an annular surface 252 of the control spool 202 as well as onto face surface 222 of a metering spool 205 yet to be described. The size of the annular surface 252 is referred to by $F_2$ and the size of the face surface 222 is referred to by $F_1$.

The metering spool 205 is reciprocally mounted in a longitudinal bore 253 of the control spool 202. A pressure spring 208 urges the metering spool 205 into its initial position shown in FIG. 3. Even if control spool 202 and metering spool 205 are in the initial position shown, the pressure medium, preferably oil, can act on the two areas $F_1$ and $F_2$.

The diameter of the metering spool 205 is referred to by $D_1$ and the diameter of control spool 202 is referred to by $D_2$. The metering spool 205 comprises at its outer circumference an annular space 220. Space 220 is connected via a bore 221 with the annular channel 217. Moreover, said annular space 220 is connected via radial bores 254 with a longitudinal bore 219. Longitudinal bore 219 in turn leads to a spring chamber 254. Within spring chamber 254, the two springs 207 and 208 are coaxially and concentrically mounted. The spring chamber 252 is closed by common adjusting means 231. Adjusting means 231 comprises adjusting means 210 and adjusting means 206. The adjusting means 231 is provided in the form of adjustment screw means which can slide along the bore section 246 and is sealed with respect thereto by means of a seal 209. Adjustment means 210 comprises a sleeve portion 256 which extends into the spring chamber 254. Said sleeve portion 256 is provided with outer thread means 257 which engage inner thread means 258 provided in said bore section 245. A pin 204 limits the outward movement of the adjusting means 210. Adjusting means 206 are provided in the form of a screw which is screwed into a bore of the adjustment screw 210 having inner thread means. Adjusting means 206 serve for the purpose of adjusting the force of the spring 208. A nut 211 is used to fixedly locate adjustment means 206. A seal 209 is provided between adjustment means 210 and said nut 211. Additional seals are shown and are also referred to by reference numeral 209. The adjustment means 206 is used for adjusting the secondary pressure value and the adjustment means 210 serves for the adjustment of the monitoring or surveillance pressure value.

In accordance with an important concept of the present invention, the control spool 202 and the metering spool 205 each are provided with a pressure spring 207 and 208, respectively, wherein the spring constants $R_1$ and $R_2$, respectively, are related to each other as are the appropriate surfaces $F_1$, $F_2$ which are subject to pressure. This means that the spring constants of springs 7 and 8 have the same relationship as the annular surface springs 7 and 8 have the same relationship as the annular surface $F_2$ of spool 202 to the circular surface $F_1$ of spool 205, i.e., the following equation holds true:

$$\frac{R_1}{R_2} = \frac{F_2}{F_1} = \frac{D_2^2 - D_1^2}{D_1^2}$$

wherein $R_1$ is the spring constant of spring 207 and $R_2$ is the spring constant of spring 208 and D1 and D2 are the diameters of spool 205 and spool 202, respectively.

Accordingly, if a new adjustment of the secondary pressure is made, both pressure values, i.e., the secondary pressure value as well as the monitoring pressure value will be adjusted in parallel. This means that the switch-off point defined by the monitoring pressure will always be by the same pressure differential lower than the adjusted secondary pressure.

It should be noted that the two pressure springs are provided in the form of coil pressure springs.

Summarizing the invention it can be seen that the embodiment of FIGS. 1 to 3 has the advantage of providing two totally separate pressure chambers, i.e. pressure chamber 21 for the monitoring of the secondary pressure and pressure chamber 19. The separate pressure chambers 19 and 21 make it possible to directly monitor or survey the actual pressure, for instance, at a hydraulic clamping cylinder (not shown) or the spindle. In such a situation the dotted passage means within the housing would not be used, but the dotted line 37 would not only be connected with port A but also with said clamping cylinder. This way no errors due to pressure losses up to the clamping cylinder caused by valves and flow resistance in between, will occur. It is quite important for providing the utmost clamping safety for a work piece, because otherwise the metered monitoring pressure is higher than the actual pressure at the clamping cylinder by the amount of the pressure losses.

It should be further noted that the valve apparatus of the invention as represented by the above two embodiments provides for adjusting means having adjustment screws 6 and 10 and 206 and 210, respectively as well as first or control spool means 2 and 202 as well as second or metering spool means 5 or 205 in a coaxial arrangement. The switching pin 4 is offset with respect to the center line of said first and second spools. Moreover, the area of the metering spool subject to the secondary pressure divided by the area of the control spool subjected to the secondary pressure equals the ratio of the spring constant of the spring biasing the metering spool and the spring constant of the spring biasing the control spool.

The coaxial design of the adjusting means and of the spools provide for a small compact design. Also, the adjustment of the secondary pressure and of the adjustable pressure differential can occur from one side.

I claim:

1. A valving apparatus comprising:

a 3-way pressure reducing valve for reducing the primary pressure of a pressure medium to a secondary pressure, secondary pressure monitoring means for monitoring the actual secondary pressure and for providing information whether or not the actual secondary pressure exceeds or is below a predetermined secondary pressure value, said secondary pressure monitoring means including second spool means, housing means, longitudinal bore means in said housing means, port means provided in said housing means and connecting supply a pressure medium, load port means adapted to be supplied with pressure medium, and tank port means, first spool means reciprocally mounted in said longitudinal bore means and adapted to provide a predetermined path of flow between said ports, pressure chamber means at a first end of said first spool means and in fluid communication with said load port means carrying pressure medium having the secondary pressure, first spring means arranged in said housing and adapted to act on the second end opposite to said first end of said first spool means to bias said first spool means into a first position, second spool means reciprocally mounted in said longitudinal bore means and arranged coaxially to said first spool means, second spring means arranged in said housing means and adapted to urge said second spool means into a first position against the force created by pressure medium having the secondary pressure which acts on said second spool means in a direction opposite to said second spring means, a first adjustment screw for adjusting the force applied by said first spring means onto said first spool means, and comprising outer thread means for engagement with inner thread means provided on said inner longitudinal bore, a second adjustment screw for adjusting the force applied by said second spring means onto said second spool means, and comprising outer thread means adapted for engagement with inner thread means provided on a bore in said first adjustment screw, said first and second adjustment screws being adjustable independently from each other and being coaxially arranged with respect to said first and second coaxially arranged first and second spools.

2. The apparatus of claim 1 wherein said first and second adjustment screws are coaxially and concentrically mounted.

3. The apparatus of claim 2 wherein said first and second spring means are concentrically mounted with respect to each other and coaxially with respect to said first and second spool means and said first and second adjustment screws.

4. The apparatus of claim 1 wherein the secondary pressure acts on a first area of said first spool to create a force acting against the force applied by said first spring having a first spring constant, and wherein said secondary pressure further acts on a second area of said second spool to create a force acting against the second spring means having a second spring constant, and wherein the ratio of the second area to the first area is equal to the ratio of the spring constants of the second spring to the first spring.

5. The apparatus of claim 1 wherein said first spool means and said second spool means are arranged adjacent to each other.

6. The apparatus of claim 1 wherein said first spool means is independent from the movement of said second spool means.

7. The apparatus of claim 1 wherein the first spool means forms a pressure chamber with said housing means, said pressure chamber being supplied with said secondary pressure.

8. The apparatus of claim 1 wherein the second spool means has a step-shaped outer circumference.

9. The apparatus of claim 1 wherein switching means are provided adapted to be actuated by said second spool so as to provide a signal when the monitoring pressure is reached and to supply another signal when the secondary pressure falls below said monitoring pressure.

10. A valving apparatus comprising:

a 3-way pressure reducing valve for reducing the primary pressure of a pressure medium to a secondary pressure, a secondary pressure monitoring means for monitoring the actual secondary pressure and for providing information whether or not the actual secondary pressure exceeds or is below a predetermined secondary pressure value, said secondary pressure monitoring means including second spool means, housing means, longitudinal bore means in said housing means, port means provided in said housing means and connecting said longitudinal bore means with pump port means adapted to supply a pressure medium, load port means adapted to be supplied with pressure medium, and tank port means, first spool means reciprocally mounted in said longitudinal bore means and adapted to provide a predetermined path of flow between said ports, pressure chamber means at a first end of said first spool means and in fluid communication with said load port means carrying pressure medium having the secondary pressure, first spring means arranged in said housing and adapted to act on the second end opposite to said first end of said first spool means to bias said first spool means into a first position, said second spool means being reciprocally mounted in said longitudinal bore means and arranged coaxially to said first spool means, said spring means arranged in said housing means and adapted to urge said second spool means into a first position against the force created by pressure medium having the secondary pressure which acts on said second spool means in a direction opposite to said second spring means, first adjustment means for adjusting the force applied by said first spring means onto said first spool means, second adjustment means secondary for adjusting the force applied by said second spring means onto said second spool means, said first and second adjustment means being adjustable independently from each other, and third adjustment means which provide for the common adjustment of the first and second adjustment means such that during adjustment of a secondary pressure value the appropriate monitoring pressure value is automatically adjusted.

* * * * *